United States Patent [19]

Guérin et al.

[11] Patent Number: 4,780,891
[45] Date of Patent: Oct. 25, 1988

[54] METHOD AND DEVICE FOR SYNCHRONIZING SYCHRONOUS DIGITAL BIT STREAMS

[75] Inventors: Jean-Pierre Guérin, Trelevern; Jean-Paul Le Meur; Jean-Paul Morpain, both of Lannion, all of France

[73] Assignee: Alcatel Cit, Paris, France

[21] Appl. No.: 71,129

[22] Filed: Jul. 8, 1987

[30] Foreign Application Priority Data

Jul. 10, 1986 [FR]  France .................................. 86 10093

[51] Int. Cl.⁴ .............................................. H04L 7/04
[52] U.S. Cl. ..................................... 375/111; 375/118; 370/108
[58] Field of Search ................. 375/83, 111, 118, 119; 371/42, 46, 47; 370/100, 108

[56] References Cited

U.S. PATENT DOCUMENTS

| | | | |
|---|---|---|---|
| 3,306,978 | 2/1967 | Simmons et al. | 375/115 X |
| 3,992,580 | 11/1976 | Bittal et al. | 375/118 X |
| 4,229,824 | 10/1980 | En | 375/119 |
| 4,280,099 | 7/1981 | Rattlingourd | 375/119 X |
| 4,415,984 | 11/1983 | Gryger et al. | 364/900 |
| 4,451,917 | 5/1984 | De Coursey | 370/108 |

FOREIGN PATENT DOCUMENTS 1122790  8/1968  United Kingdom .
2102251  1/1983  United Kingdom .

Primary Examiner—A. D. Pellinen
Assistant Examiner—Derek S. Jennings
Attorney, Agent, or Firm—Sughrue, Mion, Zinn, Macpeak & Seas

[57] ABSTRACT

In a method of synchronizing synchronous digital bit streams each comprising bits each having the same duration, one of the bit streams is taken as a reference. This provides a basis for defining successive reference time intervals each equal to the bit duration. A plurality of timing windows are defined within each reference time interval. A second bit stream is subjected to a time-delay that can have a null or zero value. One of the windows is taken as a reference window on the basis of a required phase relationship between the reference bit stream and this second bit stream. The phases of the reference bit stream and the second bit stream are compared to determine a window containing the beginning of each bit of the second bit stream. The time-delay, if any, to be applied to the second bit stream is determined on the basis of this window. A switching device is commanded by a signal corresponding to this time-delay to insert into a transmission line carrying the second bit stream a time-delay device imposing the necessary time-delay. As a result, the beginning of each bit of the second bit stream is situated in the reference window.

10 Claims, 4 Drawing Sheets

METHOD AND DEVICE FOR SYNCHRONIZING SYCHRONOUS DIGITAL BIT STREAMS

BACKGROUND OF THE INVENTION

1. Field of the Invention

The invention concerns synchronization of synchronous digital bit streams.

2. Description of the Prior Art

It is known to transmit information over a line in the form of a binary bit stream and processing of the information often entails reading the binary bit stream by means of the associated clock signal. This reading is generally effected by means of a D type flip-flop. The information is read on the rising or falling edge of the clock signal driving the flip-flop and passed to the output of the flip-flop. For the reading to be effected correctly the information has to be present for at least a setup time before the active (rising or falling) edge of the clock signal and for at least a hold time after this edge.

When there is more than one bit stream, each bit stream being transmitted by a respective line, the bit streams are made synchronous, in accordance with CCITT Recommendation G. 701, when their significant instants occur at exactly the same rate on average, the bit streams possibly being affected by amplitude jitter lying between specified limits.

It is therefore possible to read synchronous digital bit streams by means of a common clock signal running at the rate at which the significant instants of the bit streams occur, provided that the conditions in respect of setup and hold times are respected. As a general rule these conditions do not raise any problem when the information is at a low bit rate. On the other hand, it becomes necessary to synchronize the bit streams when the hold and setup times and the spread in propagation time in the logic circuits and amplifiers sending the bit streams and in the transmission lines are no longer negligible in comparison with the bit duration, in other words when the bit streams have a high bit rate.

An object of the invention is to synchronize synchronous digital bit streams, in particular to enable them to be read by a common clock signal.

SUMMARY OF THE INVENTION

In one aspect, the invention consists in a method of synchronizing synchronous digital bit streams each comprising bits each having the same bit duration, wherein one of said bit streams is taken as a reference and provides a basis for defining successive reference time intervals each equal to said bit duration, a plurality of timing windows are defined within each reference time interval, a second bit stream is subjected to a time-delay that may have a null or zero value, one of said windows is taken as a reference window on the basis of a required phase relationship between said reference bit stream and said second bit stream, the phases of said reference bit stream and said second bit stream are compared to determine a window containing the beginning of each bit of said second bit stream, the value of said time-delay to be applied to said second bit stream is determined on the basis of said window, and a switching device is commanded by a signal corresponding to said time-delay to insert into a transmission line carrying said second bit stream a time-delay device imposing a time-delay equal to said time-delay to be applied to said second bit stream so as to situate the beginning of each bit of said second bit stream in said reference window.

In another aspect, the invention consists in a device for implementing the method as defined in the preceding paragraph, said device comprising a timing window generator adapted to be connected to a first line carrying said reference digital bit stream, a phase comparator connected to said timing window generator, a time-delay selector connected to said phase comparator, a switching device, an input of said switching device connected to said time-delay selector, a plurality of time-delay circuits each imposing a respective time-delay which is a multiple of a common basic time-delay adapted to be connected to a second line carrying said second digital bit stream before it is subjected to said time-delay, a plurality of inputs of said switching device adapted to be connected to said second line and to said time-delay devices, the number of inputs of said switching device being one greater than the number of said time-delay circuits, an output of said switching device adapted to be connected to a third line carrying said second bit stream after it is subjected to said time-delay, and an input of said phase comparator adapted to be connected to said third line.

The method in accordance with the invention requires that the synchronous digital bit streams comprise a minimum number of transitions, a condition which is generally met when they are from an optical or coaxial line terminal comprising a limited sum encoder or scrambler.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
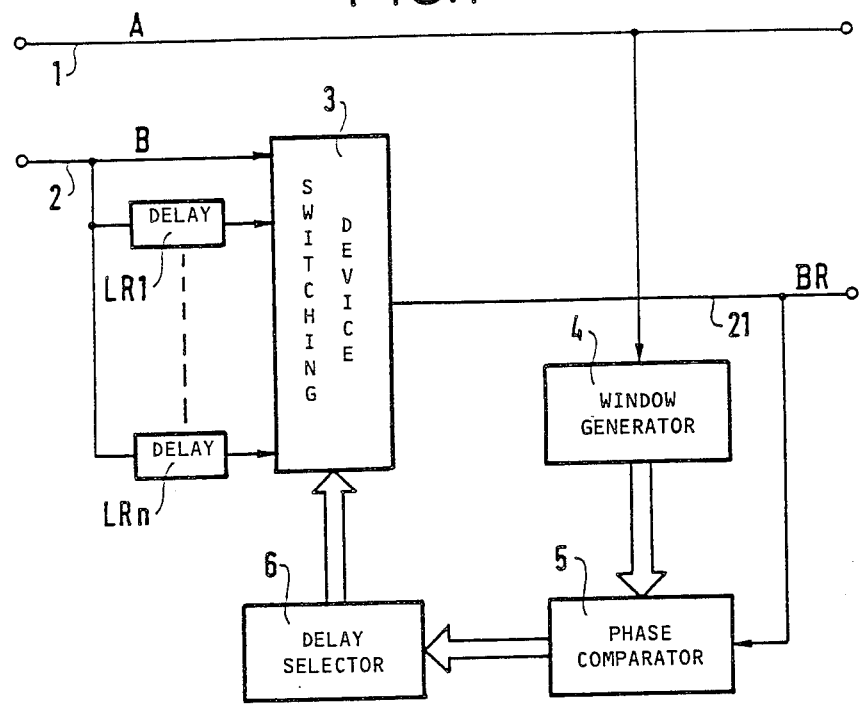
FIG. 1 is a block diagram of a device in accordance with the invention for synchronizing two bit streams.

In the device shown in block diagram form in FIG. 1 two lines 1 and 2 carry respective synchronous digital bit streams A and B each with the same bit duration T; time-delay devices LR1 through LRn have their input connected to line 2 and their output connected to a switching device 3; line 2 is also connected direct to the switching device; a line 21 connected to the output of the switching device carries a digital bit stream BR which is the delayed digital bit stream B, the time-delay being that imposed by one of the time-delay devices through which the digital bit stream B has passed. A timing window generator circuit 4 has its input connected to line 1 and its output connected to a phase comparator 5 which also has an input connected to line 21; a time-delay selector circuit 6 has its input connected to the phase comparator 5 and its output connected to the selector device 3.

The timing window generator circuit 4 generates timing windows in successive time intervals each having the same duration T as one bit, defined on the basis of the digital bit stream A taken as a phase reference and referred to hereinafter as the reference time interval, there being four windows in each reference time interval, for example. The phase comparator 5 connected to line 21 and to the timing window generator circuit 4 serves to determine the timing window in which changes of level (positive transitions for example) occur in the digital bit stream on line 21. An indication of the timing window in which the transitions occur is sent to the time-delay selector circuit 6 which sends to the switching device 3 a signal indicating the selected time-delay device; on receiving said signal the switching device connects the output of the selected time-delay device to line 21. There is thus obtained on line 21 a digital bit stream BR the time-delay of which relative to the digital bit stream B is that imposed by the selected time-delay device.

The operation is repeated until the transitions in the digital bit stream BR are situated in a predetermined timing window known as the reference window determined by the required phase relationship between the two digital bit streams. Thus to render two bit streams in phase with each other the timing window giving the greatest eye aperture common to the two bit streams will be chosen. It is this case that will be described by way of example in what follows.

Figure 2:
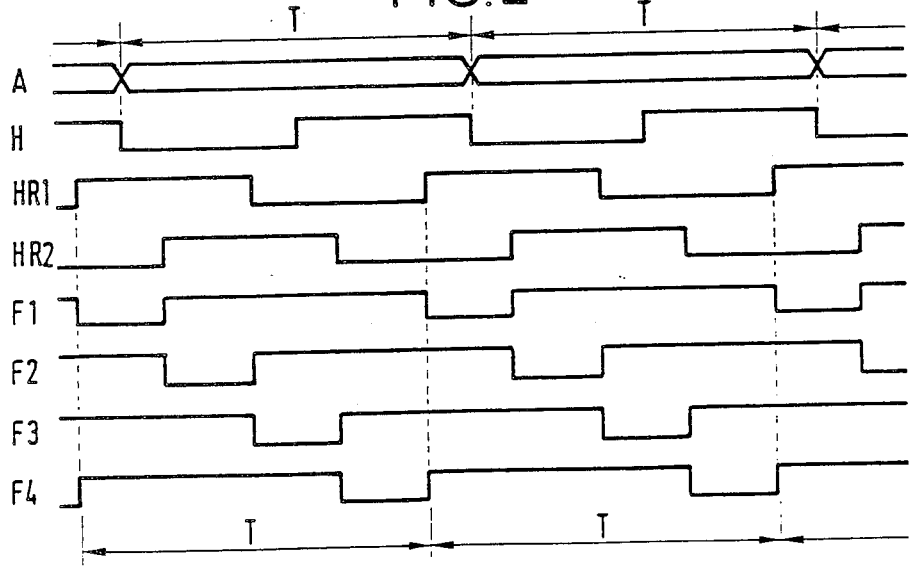
FIG. 2 is a diagram showing timing windows as defined by a circuit from FIG. 1.

FIG. 2 is a diagram showing the timing windows delivered by the timing window generator circuit 4 from FIG. 1; line A represents bit stream A, taken as a reference; the bit times of bit stream A (that is to say, the successive time intervals occupied by respective successive bits of this bit stream) are identified by their duration T shown above line A; line H represents the clock signal of bit stream A, recovered from the bit stream, the rising edges of which coincide with the centers of the bit times of bit stream A; line HR1 shows the clock signal H delayed by a time $3T/8$, that is to say by three-eighths of the bit duration T; line HR2 shows the clock signal HR1 delayed by a time $T/4$, that is to say the clock signal H delayed by a time $5T/8$; lines F1, F2, F3 and F4 show the four timing windows, in this instance each of duration $T/4$, derived from the clock signals HR1 and HR2 in each of the reference time intervals identified by their duration T below line F4. These reference time intervals are in this instance shifted by $T/8$ relative to the bit times of bit stream A which thus begin at the center of window F1.

Figure 3:
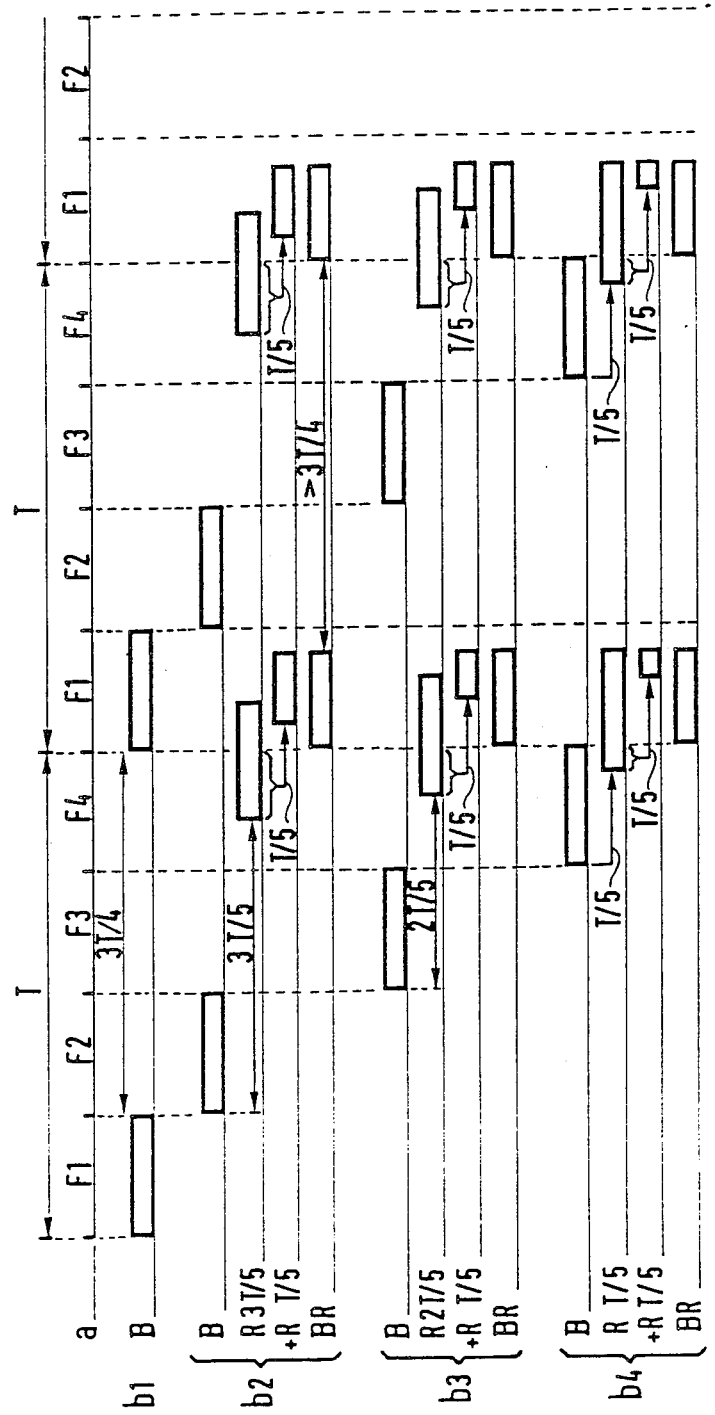
FIG. 3 shows one example of the method of synchronizing two digital bit streams.

FIG. 3 shows one example of the method of synchronizing the two digital bit streams A and B, the bit stream A being taken as the reference; in this example the bit stream B can be delayed in increments of $T/5$. Line a shows the four timing windows F1 through F4 and lines b1, b2, b3 and b4 show in four instances the position of the bit stream B relative to the bit stream A.

In the case of line b1, each positive transition of the bit stream B occurs, as shown by the areas drawn in thicker line, in the timing window F1 which follows on immediately from the beginning of the reference time interval and at the center of which the bit time of the bit stream begins. This window F1 being chosen as the reference window, the bit stream B is considered to be positioned correctly; thus no time-delay is imposed on it and in FIG. 1 line 2 is connected directly to line 21 by the switching device.

In the second case (b2) each positive transition in the bit stream B occurs in the timing window F2. The line R $3T/5$ shows the position of the bit stream B delayed by a time $3T/5$, as indicated by the areas drawn in thicker line, and it will be seen that part of this area is situated in the timing window F1 and another part of this area is situated in the timing window F4. If the positive transition in the bit stream B delayed by this amount is situated in the timing window F1 the bit stream B delayed by this amount is considered to be positioned correctly; on the other hand, if the positive transition occurs in the timing window F4, the time-delay of $3T/5$ is insufficient and it is necessary to impose an additional time-delay of $T/5$, as indicated by the line $RT/5$. The line BR shows the area in which the positive transition occurs after final positioning of the bit stream B, this bit stream having been delayed by a time $3T/5$ or $4T/5$.

In FIG. 1 line 21 is connected to the time-delay device imposing the time-delay $3T/5$ by the switching device 3 and this connection is not changed if the bit stream BR is correctly positioned. If not, it is necessary to introduce a further time-delay of $T/5$; this is achieved by connecting line 21 to a time-delay device imposing a time-delay of $4T/5$. Thus in FIG. 1 the time-delay devices LR1, LR2, ... LRn impose respective time-delays of $T/5$, $2T/5$, ... $nT/5$.

In the third case (lines b3) each positive transition in the bit stream B occurs in the timing window F3. The line R $2T/5$ shows the position of the bit stream B delayed by a time $2T/5$, as shown by the areas in thicker line, and it will be seen that part of this area is situated in the timing window F1 and another part of this area is situated in the timing window F4. If the positive transition in the bit stream B delayed by this amount is situated in the timing window F1 then the bit stream B delayed by this amount is considered to be positioned correctly and line 21 is connected to the time-delay device LR2 imposing a time-delay of $2T/5$. On the other hand, if the positive transition is situated in the timing window F4 it is necessary to impose a further time-delay of $T/5$, as shown by the line $RT/5$, to obtain a total time-delay of $3T/5$; this is achieved by connecting line 21 to the time-delay device LR3. Line BR represents the area in which the positive transition occurs, the bit stream B having been delayed by a time $2T/5$ or $3T/5$.

In the fourth case (lines b4) each positive transition occurs in the timing window F4. The first line $RT/5$ shows the position of the bit stream B delayed by a time $T/5$; if the positive transition still occurs in the timing window F4 it is necessary to impose a further time-delay of $T/5$, as shown by the second line $RT/5$. Line BR shows the area in which the positive transition in the bit stream B occurs after the time-delay of $T/5$ or $2T/5$ is imposed.

Figure 4:
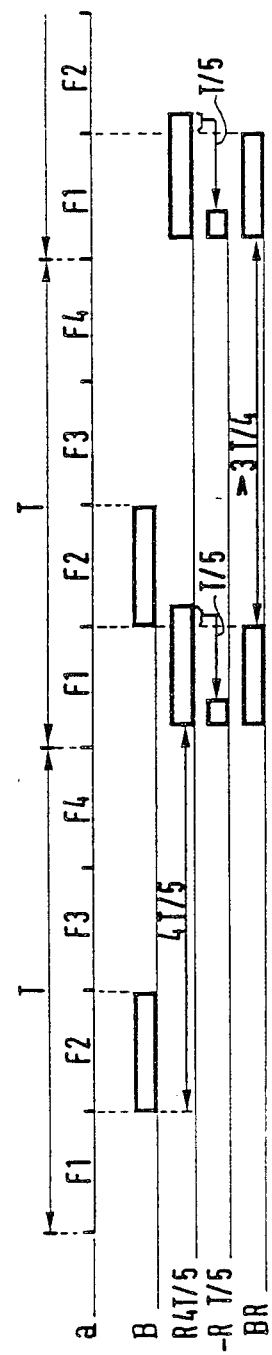
FIG. 4 shows another example of the method of synchronizing two digital bit streams.

FIG. 4 shows an alternative positioning process for the second case from FIG. 3. The line B shows the position of the bit stream B in which each positive transition occurs in the timing window F2. The line R4 $T/5$ shows the position of the bit stream B after it is delayed by $4T/5$. It will be seen that part of the area in thicker line is situated in the timing window F1 and another part of this area is situated in the window F2; consequently, if the positive transition still occurs in the timing window F2 the time-delay of $4T/5$ is too long and it is necessary to reduce it by T/5, as shown by the line -R T/5, which entails changing from the time-delay device LR4 to the time-delay device LR3. The line BR shows the area in which the positive transition occurs after the time-delay of 4 T/5 or 3 T/5 is imposed. It is seen in this figure that the time-delay of 4 T/5 is equivalent to an advance of T/5 and that the reduction of the time-delay by T/5 for the part of the thicker line area situated in the timing window F2 is equivalent to a further advance of T/5; the line BR shows the area in which the positive transition occurs after this advance of T/5 or 2 T/5.

The area BR in FIG. 4 has the same length (duration) as the area BR in FIG. 3 (lines b2) and although this area is situated in the timing window F1 in both figures, in FIG. 3 it begins with the window F1 and in FIG. 4 it ends with the window F1.

In the third case from FIG. 3 the bit stream B could be delayed by 3 T/5 and the time-delay reduced by T/5 for the part of the area still situated in the window F2.

In the fourth case from FIG. 3 the bit stream B would be delayed by 2 T/5 and the time-delay reduced by T/5 for the area still situated in the timing window F2.

It will be noted that in all cases the eye aperture common to the two bit streams A and B is at least equal to 3 T/4 once synchronization is achieved.

To increase the size of this eye aperture a reference window narrower than the other windows may be chosen, it being understood that the amount by which the time-delays are incremented has to be less than the width of the reference window, leading to an increase in the number of time-delay devices and therefore an increase in the complexity of the synchronization device.

Taking the example of four timing windows and a time-delay increment of T/5, the number n of time-delay devices is equal to four and the maximum time-delay needed is 4 T/5.

Figure 6:
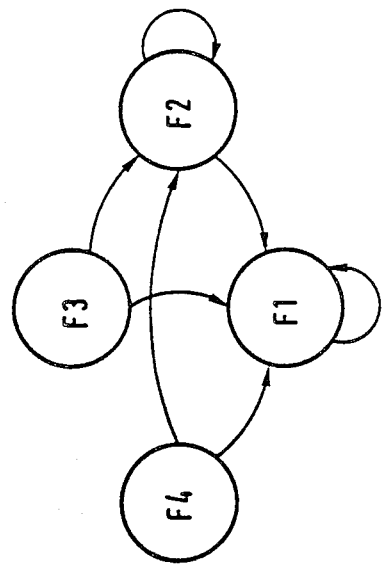
FIG. 6 represents a state diagram relating to FIG. 4.
Figure 5:
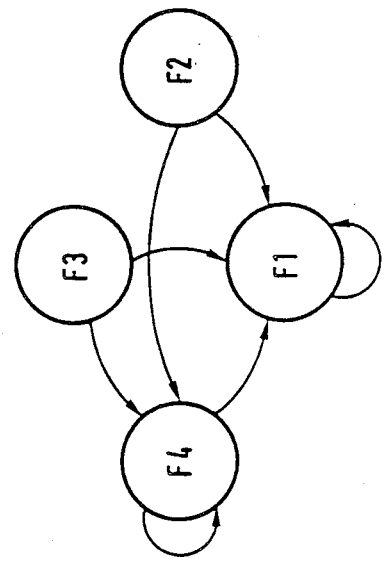
FIG. 5 represents a state diagram relating to FIG. 3.

FIG. 5 shows a state diagram for the FIG. 3 example and FIG. 6 shows a state diagram for the FIG. 4 example.

In FIGS. 5 and 6 the loop on the timing windows F2 and F4 can only occur once, unlike the loop on the timing window F1 which is continuous once synchronization has been achieved, unless of course there later occurs a relative phase shift between bit streams A and B which positions the bit stream B in one of the windows F2 or F4 whereupon the synchronization process operates to resynchronize the bit streams. It will be noted that if resynchronization is needed later and results in the imposition of an additional time-delay of T/5 when the time-delay is already 4 T/5, the result is a time-delay of 5 T/5 which is equivalent to eliminating any time-delay at all; this occurs if the transitions were initially in the timing window F2, the time-delay imposed being 4 T/5 as in the FIG. 3 example, and the relative phase shift moves the transitions of the bit stream B into the timing window F4. Likewise, if the initial time-delay was T/5 and the relative phase shift moved the transitions in the bit stream B into the timing window F2, requiring an additional time-delay of 4 T/5, the total time-delay of 5 T/5 would be equivalent to a null time-delay, i.e. to elimination of the initial time-delay. It is therefore seen that limiting the number of time-delay devices to four is sufficient in all possible cases of the positions of the transitions.

The case where the transitions are situated in the timing window F3 may occur on starting up, during the first synchronization of the bit stream; thereafter, the relative drift being slow, any relative phase shift necessarily moves the transitions into one of the timing windows F2 or F4 and the return to synchronization is achieved by entering at most one intermediate state, as shown in the state diagrams in FIGS. 5 and 6. This intermediate state may be eliminated by choosing for the width of the timing windows F2 and F3 a value less than or equal to T/5 and by increasing commensurately the width of the timing window F3.

Figure 7:
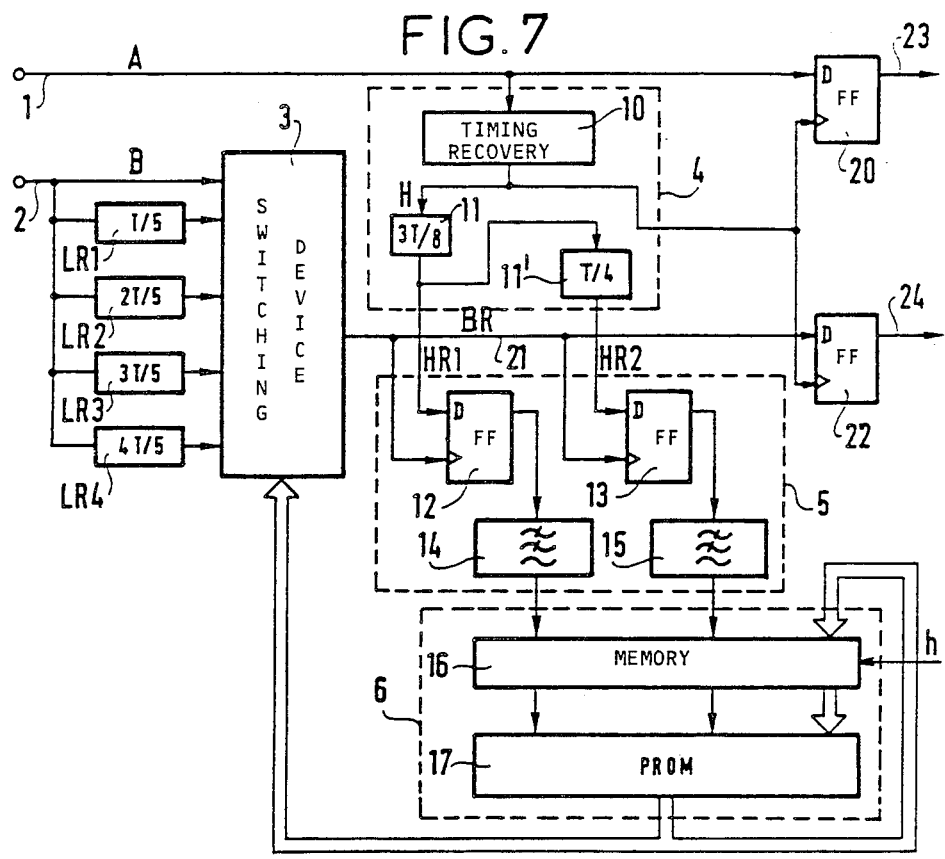
FIG. 7 shows one embodiment of the device in accordance with the invention.

FIG. 7 shows one embodiment of a device in accordance with the invention; the devices and circuits from FIG. 1 are shown again, with the same reference numbers. The timing window generator circuit 4 comprises a timing recovery circuit 10 and two time-delay devices 11 and 11'. The timing recovery circuit has its input connected to line 1 and receives from this the digital bit stream A; it supplies at its output the clock signal H; the time-delay device 11 receives the clock signal H and delivers the delayed clock signal HR1, this signal being delayed by three-eighths of the period of the clock signal H (3T/8); the time-delay device 11' delivers the clock signal HR2 delayed by T/4 relative to the clock signal HR1 and by 5T/8 relative to the clock signal H. The phase comparator 5 comprises two D type flip-flops 12 and 13; the flip-flop 12 has a data input connected to the output of the time-delay device 11 and the flip-flop 13 has a data input connected to the output of the time-delay device 11'; the flip-flops 12 and 13 are clocked by the positive transitions in the digital bit stream BR, their clock inputs being connected to line 21. The flip-flop 12 has a direct output connected to a filter 14 and the flip-flop 13 has a direct output connected to a filter 15; the filters 14 and 15 are low-pass filters for reducing the sensitivity of the device.

The time-delay selector circuit 6 comprises a register or memory 16 driven by a clock signal h the period of which is long relative to the period T of the clock signal H and slightly greater than the time constant of the filters 14 and 15. It also comprises a programmable read-only memory 17. The memory 16 has inputs connected to the filters 14 and 15 and memorizes the signals delivered by the flip-flops 12 and 13 after they have passed through the filters; it also has an input connected to the output of the read-only memory 17 the input of which is connected to the output of the memory 16. The output of the read-only memory 17 is also connected to a control input of the switching device 3 (a multiplexer, for example).

Two D type flip-flops 20, 22 serve to sample the bit streams A and BR, respectively, at the center of their common minimal eye aperture. They have their data input connected to lines 1 and 21, respectively; they have their clock input connected to the output of the timing recovery circuit 10 from which they receive the clock signal H and they are triggered on rising edges. Each flip-flop 20, 22 has a direct output connected to a respective line 23, 24, the line 23 delivering the digital bit stream A, the line 24 delivering the digital bit stream BR and these digital bit streams being in phase.

The flip-flops 12 and 13 deliver signals with the value 0 or 1 according to the position of the positive transitions in the digital bit stream BR. Referring to FIG. 2, it is seen that these signals have the following values depending on the timing window in which the transitions occur:

| Window | Flip-flop 12 | Flip-flop 13 |
|---|---|---|
| F1 | 1 | 0 |
| F2 | 1 | 1 |
| F3 | 0 | 1 |
| F4 | 0 | 0 |

These values are memorized in the memory 16 and are used in conjunction with output information from the read-only memory 17 to address the read-only memory. The information provided by the read-only memory corresponds to a time-delay of zero, T/5, 2 T/5, 3 T/5, 4 T/5 and is used to address the multiplexer for a connection to line 2 (zero delay) or to one of the time-delay devices LR1 through LR4 (time-delays T/5 through 4 T/5).

This time-delay and the code for the timing window in which the transitions of the bit stream BR occur determine an address in the read-only memory 17.

For example, if the time-delay is zero and the transitions in the bit stream BR (which in this case is the bit stream B) occur in the timing window F2, the address of the time-delay as delivered by the read-only memory is that corresponding to a time-delay of 4 T/5, taking the FIG. 4 example; after the multiplexer connects line 21 to the time-delay device LR4, if the transitions in the bit stream BR occur in the window F1 the read-only memory 17 will deliver the same address for the time-delay 4 T/5; on the other hand, if the transitions still occur in the window F2 the read-only memory will deliver the address of the time-delay 3 T/5. Likewise if, while the bit stream B is delayed by 4 T/5, for example, there occurs a relative phase shift between the streams A and B, and thus between the bit stream A and the bit stream BR, and if the transitions then occur in the window F4, the read-only memory delivers the address of the time-delay 4 T/5+2 T/5=6 T/5, that is the address of the time-delay T/5; if the transitions occur in the window F2 the read-only memory delivers the address of the time-delay 4 T/5−T/5=3 T/5 so that the transitions in the bit stream BR occur in the window F1. Then, provided that there is no phase shift between the bit streams, the read-only memory delivers the same time-delay address.

As a consequence of this, the address delivered by the memory 16 to the read-only memory consists of the code for the timing window in which the transitions occur and the address of the previous time-delay and, provided that the transitions occur in the timing window F1, the previous time-delay is retained.

The following tables specify the value of the time-delay to be imposed according to the timing window in which the transitions occur and the value of the previous time-delay, table I relating to the FIG. 4 situation where for a null previous time-delay the time-delays have the values zero, 4 T/5, 3 T/5, 2 T/5 for the timing windows F1, F2, F3, F4, respectively, and table II relating to the FIG. 3 situation where for a null previous time-delay the time-delays have the values zero, 3 T/5, 2 T/5, T/5 for the timing windows F1, F2, F3, F4, respectively.

TABLE I

| TIME-DELAY | F1 | F2 | F3 | F4 |
|---|---|---|---|---|
| 0 | 0 | 4 T/5 | 3 T/5 | 2 T/5 |
| T/5 | T/5 | 0 | 4 T/5 | 3 T/5 |
| 2 T/5 | 2 T/5 | T/5 | 0 | 4 T/5 |
| 3 T/5 | 3 T/5 | 2 T/5 | T/5 | 0 |
| 4 T/5 | 4 T/5 | 3 T/5 | 2 T/5 | T/5 |

TABLE II

| TIME-DELAY | F1 | F2 | F3 | F4 |
|---|---|---|---|---|
| 0 | 0 | 3 T/5 | 2 T/5 | T/5 |
| T/5 | T/5 | 4 T/5 | 3 T/5 | 2 T/5 |
| 2 T/5 | 2 T/5 | 0 | 4 T/5 | 3 T/5 |
| 3 T/5 | 3 T/5 | T/5 | 0 | 4 T/5 |
| 4 T/5 | 4 T/5 | 2 T/5 | T/5 | 0 |

The time-delays shown in columns F1 through F4 are those that the read-only memory delivers according to the timing window in which the transitions occur and the previous time-delay.

Figure 8:
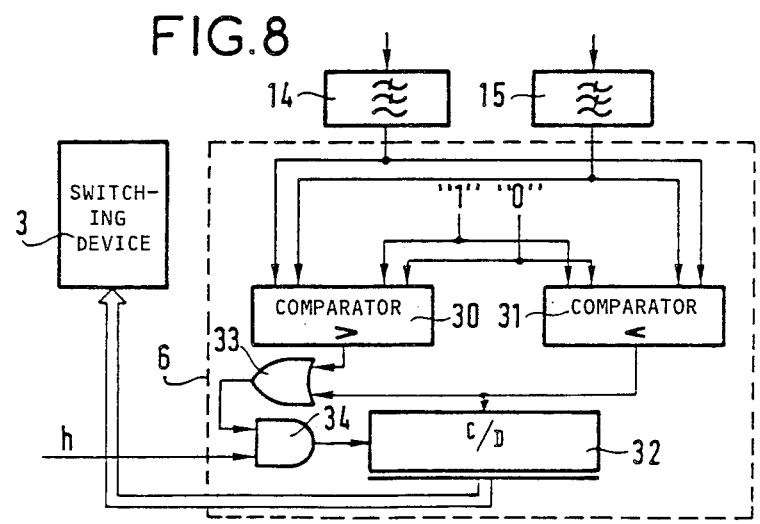
FIG. 8 shows another embodiment of the device in accordance with the invention.

FIG. 8 shows an alternative embodiment of the time-delay selector circuit 6 from FIG. 7.

In FIG. 8, two comparators 30 and 31 each have two inputs connected to the filters 14 and 15 of the phase comparator 5 from FIG. 7; these comparators also receive on two other inputs a signal of value 1 and a signal of value 0 which correspond to the code of the first timing window F1. The outputs of the comparators 30 and 31 are connected to two inputs of an "OR" type logic gate 33 the output of which is connected to an input of an "AND" type logic gate 34 which also receives the clock signal h. The output of the gate 34 is connected to the clock input of a counter/downcounter 32 which also receives on a count/downcount control input the output signal from the comparator 31. The output of the counter/downcounter 32, giving the count, is connected to the control input of the multiplexer 3 from FIG. 7. The comparators 30 and 31 compare the code for the timing window F1 and the code for the timing window in which the transitions occur, this latter code being given by the signals delivered by the filters 14 and 15.

Depending on whether the fixed code, that of the window F1, is greater than the window code delivered by the filters or not, the comparator 30 delivers a signal of value 1 or 0.

The comparator 31 delivers a signal of value 1 when the fixed code, that of the window F1, is less than the window code delivered by the filters and a signal of value 0 in the contrary case.

The output signal from the logic gate 33 therefore has the value 0 and disables the logic gate 34 when the code for the window F1 and that delivered by the filters are identical; it has the value 1 and enables the logic gate 34 in the contrary case.

If the fixed code and the code received from the filters are not identical the counter/downcounter 32 receives a pulse in each period of the clock signal h and counts up or down by one increment according to the value 0 or 1 applied to its count/downcount control input, that is to say according to whether the code delivered by the filters 14 and 15 is that of one of the windows F3 and F4 (the codes for which are less than that for the window F1) or that of the window F2 (the code for which is greater than that of the window F1). As the counter/downcounter has a scaling factor of 5, the number that it delivers corresponds to a time-delay of 0, T/5 2 T/5, 3 T/5 or 4 T/5 and commands the multiplexer. When the fixed code and the codes received are identical the counter/downcounter does not receive any pulses and the count does not change. The two bit streams A and B are thus synchronized with a time-delay increment of T/5 and synchronization of the two bit streams requires at most three pulses of the clock signal h; in the FIG. 7 embodiment synchronization requires at most two pulses of the clock signal h.

Although the device of FIG. 8 is slower in the case where synchronization requires three pulses of the clock signal h, it is simple and does not require any programming, which the read-only memory 17 in the figure 7 device does require.

FIGS. 7 and 8 are given by way of example only and it is to be understood that all or any of the devices shown may be replaced by equivalent devices without departing from the scope of the invention.

There has been specifically described the case where synchronization of the digital bit streams entails bringing them into phase with each other. It is to be understood that the invention applies to the case where some other phase relationship between the bit streams is required, the reference timing window being chosen according to the required phase relationship. Thus in the previously considered example where four timing windows each of duration T/4 are constructed, if the phase of the bit stream B relative to the bit stream A is required to be T/4, 2 T/4 or 3 T/4 the window F2, F3 or F4 would be chosen as the reference window.

Also, it is to be understood that the synchronization method described hereinabove may be applied to any number of digital bit streams B, C, D, E, ... N, the digital bit stream A being taken as a reference and each digital bit stream being synchronized by a device in accordance with the invention, such as that from FIG. 7, for example; note that the window generator circuit 4 may be shared by a number of synchronization devices, since the bit stream A is taken as the reference.

There is claimed:

1. Method of synchronizing synchronous digital bit streams each comprising bits each having the same bit duration, comprising the steps of: taking one of said bit streams as a reference and providing a basis for defining successive reference time intervals each equal to said bit duration, defining a plurality of timing windows within each reference time interval, subjecting a second bit stream to a time-delay that may have a null or zero value, taking one of said windows as a reference window on the basis of a required phase relationship between said reference bit stream and said second bit stream, comparing the phases of said reference bit stream and said second bit stream to determine a window containing the beginning of each bit of said second bit stream, determining the value of said time-delay to be applied to said second bit stream on the basis of said window, and switching a switching device to insert into a transmission line carrying said second bit stream a time-delay equal to said time-delay to be applied to said second bit stream so as to situate the beginning of each bit of said second bit stream in said reference window.

2. Method according to claim 1, wherein said time-delay to be applied to said second bit stream is a multiple of a basic time-delay the duration of which is less than that of said reference window.

3. Method according to claim 1, wherein all said windows within a reference time interval have the same duration.

4. Method according to claim 1, wherein said reference window is chosen in such a way that the bits of said reference bit stream begin at its center.

5. Device for synchronizing synchronous digital bit streams each comprising bits each having the same bit duration, wherein one of said bit streams may be taken as a reference to provide a basis for defining successive reference time intervals each equal to said bit duration, a plurality of timing windows are defined within each reference time interval, said second bit stream may be subjected to given a time-delay that may have a null or zero value, one of said windows may be taken as a reference window on the basis of a required phase relationship between said reference bit stream and said second bit stream, the phases of said reference bit stream and said second bit stream may be compared to determine a window containing the beginning of each bit of said second bit stream, the value of said given time-delay to be applied to said second bit stream may be determined on the basis of said window, and said switching device may be commanded by a signal corresponding to said given time-delay to insert into a transmission line carrying said second bit stream a time-delay equal to said time-delay to be applied to said second bit stream so as to situate the beginning of each bit of said second bit stream in said reference window, said device comprising; a timing window generator adapted to be connected to a first line carrying a reference digital bit stream, a phase comparator connected to said timing window generator, a time-delay selector connected to said phase comparator, a switching device, a control input of said switching device connected to said time-delay selector, a plurality of time-delay devices each imposing a respective time-delay which is a multiple of a common basic time-delay adapted to be connected to a second line carrying a second digital bit stream before it is subjected to said given time-delay, a plurality of inputs of said switching device adapted to be connected to said second line and to said time-delay devices, the number of said plurality of inputs of said switching device being one greater than the number of said time-delay devices, an output of said switching device adapted to be connected to a third line carrying said second bit stream after it is subjected to said given time-delay, and an input of said phase comparator adapted to be connected to said third line.

6. Device according to claim 5, wherein said plurality of time-delay devices comprises a number n of time-delay devices a first of which imposes a time-delay equal to said basic time-delay, the remainder of which impose time-delays each greater than that of the previous time-delay device by an amount equal to said basic time-delay and a last of which imposes a time-delay equal to n times said basic time-delay, the number n being such that a time-delay equal to n+1 times said basic time-delay is equal to said bit duration.

7. Device according to claim 5, wherein said timing window generator circuit comprises a timing recovery circuit adapted to be connected to said first line and two time-delay devices, said timing recovery circuit being adapted to deliver a clock signal and said two time-delay devices comprising means to deliver two delayed clock signals which are offset relative to each other by a duration equal to one quarter of said bit duration.

8. Device according to claim 7, wherein said phase comparator comprises first and second D type flip-flops, said first flip-flop has a data input connected to an output of one of said time-delay devices of said timing window generator, said second flip-flop has a data input connected to the output of the other time-delay device of said timing window generator, and each flip-flop has a clock input adapted to be connected to said third line, a first filter connected to an output of said first flip-flop and a second filter connected to an output of said second flip-flop.

9. Device according to claim 8, wherein said time-delay selector comprises a memory adapted to be triggered by a clock signal the period of which is long relative to said bit duration and a programmable read-only memory, said adapted to be triggered memory having a first input connected to said first filter, a first output connected to said read-only memory, a second input connected to said second filter and a second output connected to said read-only memory, a third input connected to the output of said read-only memory and a third output connected to a third input of said read-only memory, said read-only memory having an output connected to said control input of said switching device.

10. Device according to claim 8, wherein said time-delay selector comprises first and second comparators each having inputs connected to said two filters of said phase comparator and a further input adapted to receive a code relating to said reference window, a gate for enabling or disabling transmission of pulses of a clock signal having a period that is long relative to said bit duration, controlled by said first and second comparators and having an output connected to a clock input of a counter/downcounter having an output connected to said control input of said switching device and adapted to be switched between counting and downcounting modes by the output signal from one of said first and second comparators.

* * * * *